(12) United States Patent
Sakuma

(10) Patent No.: US 12,060,117 B2
(45) Date of Patent: Aug. 13, 2024

(54) STEERING DEVICE

(71) Applicant: Hitachi Astemo, Ltd., Hitachinaka (JP)

(72) Inventor: Haruto Sakuma, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 577 days.

(21) Appl. No.: 17/426,994

(22) PCT Filed: Jan. 8, 2020

(86) PCT No.: PCT/JP2020/000259
§ 371 (c)(1),
(2) Date: Jul. 29, 2021

(87) PCT Pub. No.: WO2020/158315
PCT Pub. Date: Aug. 6, 2020

(65) Prior Publication Data
US 2022/0194462 A1  Jun. 23, 2022

(30) Foreign Application Priority Data

Jan. 30, 2019  (JP) .................... 2019-013789

(51) Int. Cl.
*B62D 5/04* (2006.01)
*B62D 3/12* (2006.01)
*B62D 6/00* (2006.01)

(52) U.S. Cl.
CPC .......... *B62D 5/0463* (2013.01); *B62D 3/126* (2013.01); *B62D 5/0448* (2013.01); *B62D 5/0454* (2013.01); *B62D 6/00* (2013.01)

(58) Field of Classification Search
CPC .... B62D 5/0463; B62D 3/126; B62D 5/0448; B62D 5/0454; B62D 6/00
See application file for complete search history.

(56) References Cited

U.S. PATENT DOCUMENTS

| | | | | |
|---|---|---|---|---|
| 9,862,408 | B2 * | 1/2018 | Nakakuki | ............ B62D 5/0409 |
| 10,246,121 | B2 * | 4/2019 | Ikegaya | ................. B62D 5/003 |
| 10,407,092 | B2 * | 9/2019 | Sasaki | ...................... B62D 5/04 |
| 2009/0240389 | A1 * | 9/2009 | Nomura | .................... H02P 6/16 |
| | | | | 701/41 |
| 2012/0261209 | A1 * | 10/2012 | Shiino | ..................... B62D 6/10 |
| | | | | 702/41 |
| 2016/0368531 | A1 | 12/2016 | Nakakuki et al. | |
| 2017/0183029 | A1 * | 6/2017 | Uryu | .................... H02P 29/028 |

FOREIGN PATENT DOCUMENTS

WO   WO-2015/141253 A1   9/2015

OTHER PUBLICATIONS

International Search Report dated Mar. 17, 2020 issued in International Application No. PCT/JP2020/000259, with English translation, 6 pages.
Written Opinion of the International Searching Authority dated Mar. 17, 2020 issued in International Application No. PCT/JP2020/000259, with English translation, 8 pages.

\* cited by examiner

*Primary Examiner* — Kevin Hurley
*Assistant Examiner* — Michael R Stabley
(74) *Attorney, Agent, or Firm* — FOLEY & LARDNER LLP

(57) ABSTRACT

An electric motor is controlled so as to suppress movement of a steering mechanism in response to a reverse input from a road surface during travel on rough roads, for example, a gravel road or an unpaved road.

10 Claims, 14 Drawing Sheets

STEERING DEVICE

TECHNICAL FIELD

The present invention relates to a steering device.

BACKGROUND ART

Hitherto, there has been known an electric power steering device configured to apply a steering assist force to a steering mechanism of a vehicle by using an electric motor as a drive source. In Patent Literature 1, the above-mentioned electric power steering device is described.

CITATION LIST

Patent Literature

PTL 1: WO 2015/141253 A1

SUMMARY OF INVENTION

Technical Problem

In Patent Literature 1, steered wheels may become unstable and steering performance may deteriorate in response to a reverse input from a road surface during travel on rough roads, for example, a gravel road or an unpaved road.

An object of the present invention is to provide a steering device having improved steering performance.

Solution to Problem

According to one embodiment of the present invention, there is provided a steering device including: a steering mechanism including a steering member, the steering mechanism being configured to steer steered wheels in accordance with movement of the steering member; an electric motor including a motor rotor, a motor stator, and a motor rotation-angle sensor, the motor rotation-angle sensor being configured to detect a rotation position of the motor rotor, the electric motor being configured to apply a steering force to the steering mechanism via a speed reducer; the speed reducer arranged between the steering member and the electric motor, the speed reducer being configured to transmit a rotational force of the electric motor to the steering member; a steering amount sensor arranged in the steering mechanism, the steering amount sensor being configured to acquire a steering angle signal which is a signal relating to a steering angle of the steered wheels; and a controller including a motor rotation-angle signal input module, a steering angle signal input module, and a microprocessor, the motor rotation-angle signal input module being configured to receive, from the motor rotation-angle sensor, input of a motor rotation-angle signal which is a signal relating to the rotation position of the motor rotor, the steering angle signal input module being configured to receive input of the steering angle signal from the steering amount sensor, the microprocessor including a phase comparison module, a reverse input determination module, and a motor control module, the phase comparison module being configured to compare a phase of the motor rotation-angle signal with a phase of the steering angle signal, and to determine which of the phase of the motor rotation-angle signal and the phase of the steering angle signal is ahead, the reverse input determination module being configured to determine, when the phase of the motor rotation-angle signal is ahead of the phase of the steering angle signal, that a current state is a forward input state in which the steering member is being moved by the steering force of the electric motor, and to determine, when the phase of the steering angle signal is ahead of the phase of the motor rotation-angle signal, that the current state is a reverse input state in which the steering member is moving due to an external force which is an input from the steered wheels to the steering mechanism, the motor control module being configured to output, when the reverse input determination module determines that the current state is the reverse input state, a command signal to the electric motor such that movement of the steering mechanism due to the external force is suppressed.

Therefore, according to the preferred aspect of the present invention, the steered wheels can be stabilized and the steering performance can be improved by controlling the electric motor so as to suppress the movement of the steering mechanism in response to a reverse input from the road surface during travel on rough roads, for example, a gravel road or an unpaved road.

DESCRIPTION OF EMBODIMENTS

Description is given below of embodiments of the present invention with reference to the drawings.

First Embodiment

Configuration of Power Steering Device

Figure 1:
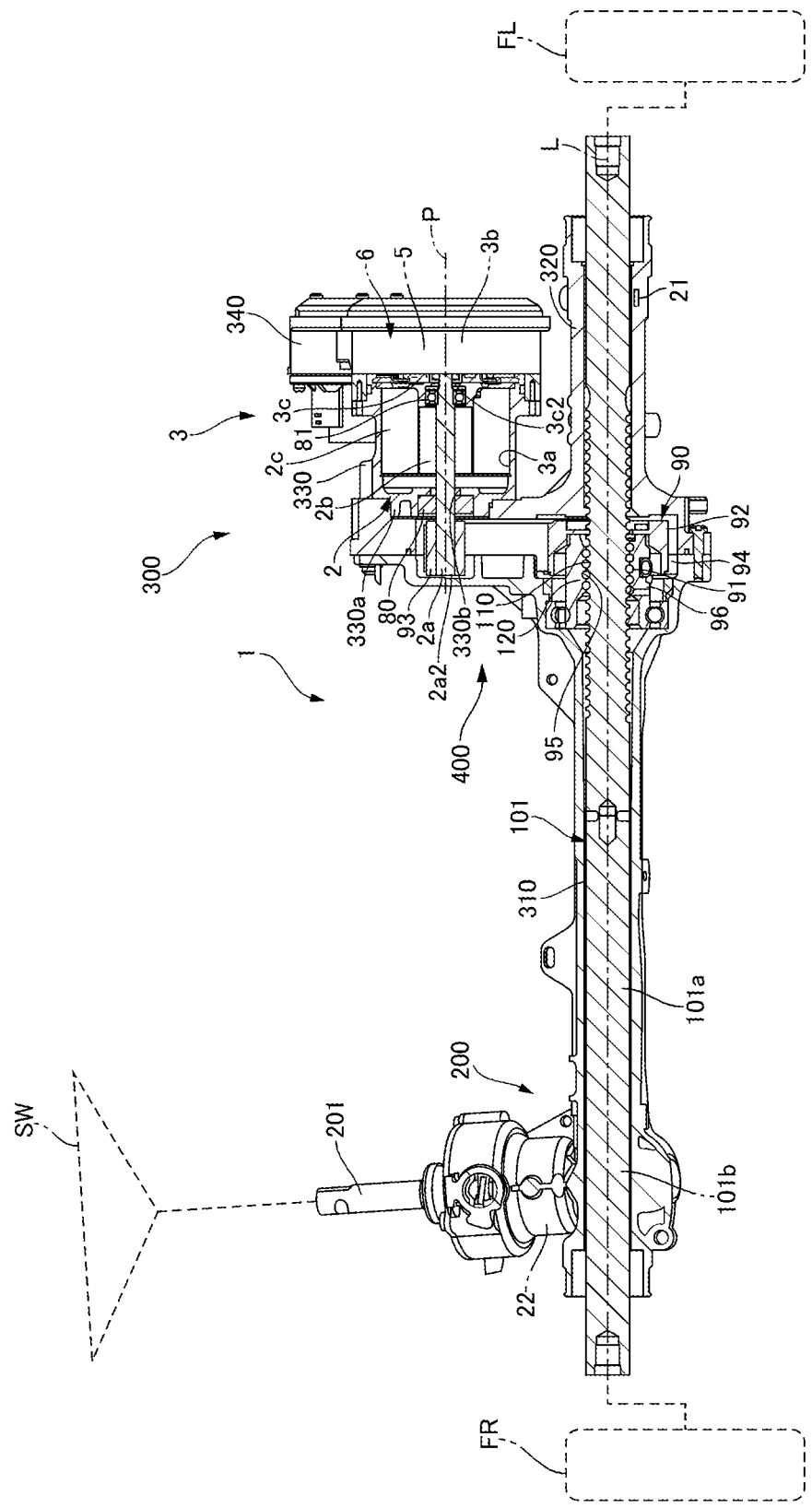
FIG. 1 is a configuration diagram for illustrating an electric power steering device 1 according to a first embodiment of the present invention.

FIG. 1 is a configuration diagram for illustrating an electric power steering device 1 according to a first embodiment of the present invention.

The electric power steering device 1 is a steering device including: a steering mechanism 200 configured to transmit rotation of a steering wheel SW steered by a driver to a rack bar (steering member) 101 including a rod-shaped rack bar main body 101a configured to steer a left front wheel FL and a right front wheel FR, which are steered wheels, and a rack-side ball screw groove 110; and an assist mechanism 300 serving as an actuator configured to apply an assist force to the rack bar 101.

Each component of the electric power steering device 1 is housed in a housing 3 constructed from a first housing 310, a second housing 320, and a motor housing 330 forming a motor housing space 3a and a controller housing 340 forming a control device housing space 3b, which are arranged in series in a rotation axis P of a motor output shaft 2a.

A partition wall portion 3c is arranged between the motor housing 330 and the controller housing 340.

The steering mechanism 200 includes a rod-shaped steering shaft 201 coupled to the steering wheel. Pinion teeth (not shown) are formed at the tip of the steering shaft 201. The pinion teeth mesh with the rack teeth 101b formed on an outer periphery of the rack bar main body 101a of the rack bar 101.

That is, the steering mechanism 200 is a rack-and-pinion type steering mechanism.

The assist mechanism 300 includes an electric motor 2, which is a motor element, and a controller 6.

Output of the electric motor 2 is controlled by the controller 6 in accordance with a steering torque and a steering amount which are input to the steering wheel SW by the driver.

The output of the electric motor 2 is transmitted to the rack bar 101 by a ball screw mechanism 90.

The ball screw mechanism 90 includes a nut 91 and a nut pulley 92. The nut pulley 92 has the appearance of a cylindrical member which is integrally rotatably fixed to the nut 91.

A cylindrical motor pulley 93 is fixed to a motor output shaft second end portion 2a2 of the motor output shaft 2a of the electric motor 2 so as to rotate integrally. The rotation axis of the nut 91 is indicated as "L", and the rotation axis of the motor pulley 93 (motor output shaft 2a) is indicated as "P".

The rotation axis P is arranged so as to be offset in the radial direction with respect to the rotation axis L.

The nut pulley 92, which is integrally fixed to the nut 91, also has the rotation axis L as a rotation axis.

An endless belt 94 serving as a flexible element is wound between the motor pulley 93 and the nut pulley 92. The endless belt 94 is made of resin. A driving force of the electric motor 2 is transmitted to the nut 91 via the motor pulley 93, the endless belt 94, and the nut pulley 92. The outer diameter of the motor pulley 93 is formed to be smaller than the outer diameter of the nut pulley 92.

A speed reducer 400 is constructed from the motor pulley 93, the nut pulley 92, and the endless belt 94.

The driving force of the electric motor 2 is transmitted to the nut 91 via the endless belt 94 serving as the flexible element, and therefore a delay occurs in the transmission of the driving force of the electric motor 2 to the steering mechanism 200.

As a result, the endless belt 94 serves as the flexible element, and this configuration increases the likelihood of a phase difference appearing between a motor rotation-angle signal θ2 and a steering angle signal θ1, which are described later. Thus, determination accuracy of a reverse input determination module 62 can be improved.

The nut 91 is formed in a tubular shape so as to surround the rack bar 101, and is rotatably arranged with respect to the rack bar 101. A spiral groove is formed on the inner peripheral side of the nut 91. This groove forms the nut-side ball screw groove 95. A spiral groove is formed on the outer periphery of the rack bar 101 at a position axially separated from the portion in which the rack teeth 101b are formed. This groove forms the rack-side ball screw groove 110.

Under a state in which the nut 91 is inserted into the rack bar 101, a ball circulating groove 120 is formed by the nut-side ball screw groove 95 and the rack-side ball screw groove 110. The ball circulating groove 120 is filled with a plurality of metal balls 96. When the nut 91 rotates, the balls 96 move in the ball circulating groove 120, and the rack bar 101 thus moves in the longitudinal direction with respect to the nut 91.

Configuration of Electric Motor

The electric motor 2 includes the motor output shaft 2a rotatably supported in the motor housing 330, a rotor 2b configured to rotate integrally with the motor output shaft 2a, and a stator 2c fixed in the motor housing 330.

The motor housing 330 is formed in a cup shape having a bottom. A bottom portion 330a is formed on the second housing 320 side of the motor housing 330. A shaft insertion hole 330b penetrating in the axial direction is formed near the center of the bottom portion 330a.

The second end 2a2 of the motor output shaft 2a on the second housing 320 side is inserted into the shaft insertion hole 330b and is arranged so as to reach the inside of the second housing 320. A bearing 80 is arranged on the second housing 320 side of the bottom portion 330a, and the motor output shaft 2a is rotatably supported by the bearing 80.

An opening on the controller housing 340 side of the motor housing 330 is closed by the partition wall portion 3c. A motor output shaft through hole 3c2 penetrating in the rotation axis P direction of the motor output shaft 2a is formed near the center of the partition wall portion 3c. A motor output shaft first end 2a1 on the controller housing 340 side of the motor output shaft 2a is inserted into the motor output shaft through hole 3c2 and arranged so as to reach the inside of the controller housing 340. A bearing 81 is arranged on the motor housing 330 side of the partition wall portion 3c, and the motor output shaft 2a is rotatably supported by the bearing 81.

The electric motor 2 includes a motor rotation-angle sensor 5, and a rotation position of the rotor 2b is detected by the motor rotation-angle sensor 5. The rotation position of the rotor 2b detected by the motor rotation-angle sensor 5 is transmitted to the controller 6.

A rack bar stroke sensor (steering amount sensor) 21 configured to detect a stroke position of the rack bar 101 is arranged in the second housing 320. The stroke position (steering position of the steered wheels FL and FR) of the rack bar 101 detected by the rack bar stroke sensor 21 is transmitted to the controller 6.

The controller 6 is mounted on a plurality of control boards. The controller 6 is configured to output a command signal from a power supply unit (not shown) to the stator 2c based on the rotation position of the rotor 2b and the stroke position of the rack bar 101, and to control the power to be supplied.

Further, there is also arranged a steering angle sensor 22 configured to detect the rotation position of the steering shaft 201, which has a pinion gear formed at the tip, and is known in Japanese Patent Application Laid-open No. 2018-47726.

As a result, even when the rack bar stroke sensor 21 fails, the steering position of the steered wheels FL and FR can be detected by using the steering angle sensor 22 as a substitute for the rack bar stroke sensor 21. Further, when the rack bar stroke sensor 21 fails, a reverse input determination described later can be continued by using the output signal of the steering angle sensor 22 as a substitute for the output signal of the rack bar stroke sensor 21.

Figure 2:
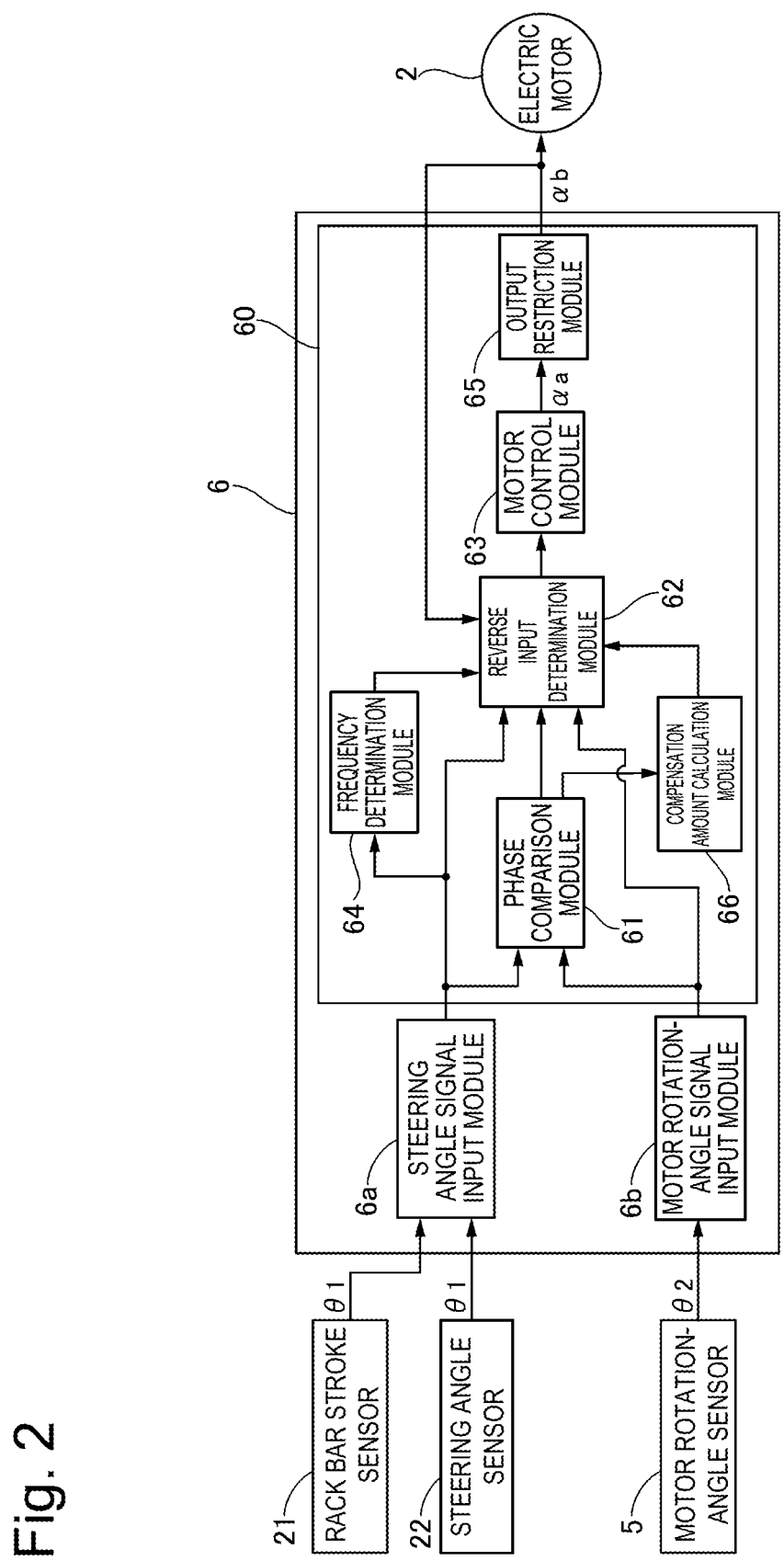
FIG. 2 is a block diagram for illustrating execution of control in the first embodiment.

FIG. 2 is a block diagram for illustrating execution of control in the first embodiment.

A steering angle signal $\theta 1$ from the rack bar stroke sensor 21 and the steering angle sensor 22 is input to a steering angle signal input module 6a of the controller 6.

A motor rotation-angle signal $\theta 2$, which is a signal relating to the rotation position of the motor rotor 2b from the motor rotation-angle sensor 5, is input to a motor rotation-angle signal input module 6b of the controller 6.

The steering angle signal input module 6a is configured to output the input steering angle signal $\theta 1$ to a phase comparison module 61, a reverse input determination module 62, and a frequency determination module 64 which are included in a microprocessor 60.

The motor rotation-angle signal input module 6b is configured to output the input motor rotation-angle signal $\theta 2$ to the phase comparison module 61 and the reverse input determination module 62.

The phase comparison module 61 is configured to compare the phase of the input steering angle signal $\theta 1$ with the phase of the motor rotation-angle signal $\theta 2$, calculate a phase difference between the steering angle signal $\theta 1$ and the motor rotation-angle signal $\theta 2$ and determine which of those signals is ahead, output the phase difference to a motor command compensation amount calculation module 66, and to output the determination result of which of the signals is ahead to the reverse input determination module 62.

The compensation amount calculation module 66 included in the microprocessor 60 is configured to calculate a compensation amount in accordance with the input phase difference, and to output the calculated compensation amount to the reverse input determination module 62.

The reverse input determination module 62 is configured to determine, when the phase of the motor rotation-angle signal $\theta 2$ is ahead of the phase of the steering angle signal $\theta 1$, that the rack bar 101 is being moved by the steering force of the electric motor 2, that is, being steered based on an intention of the driver (hereinafter "forward input state"), and determine, when the phase of the steering angle signal $\theta 1$ is ahead of the phase of the motor rotation-angle signal $\theta 2$, that the steered member is being moved by an external force which is an input from the steered wheels FL and FR to the steering mechanism 200 (hereinafter "reverse input state"), and output the determination result, the compensation amount calculated by the compensation amount calculation module 66, and the previous command signal "αb" to the motor control module 63.

The motor control module 63 included in the microprocessor 60 is configured to output, when the determination result of the reverse input determination module 62 is that a current state is a forward input state, a command signal "αa" as a steering assist force obtained by adding the compensation amount calculated by the compensation amount calculation module 66 to the previous command signal "αb", to an output restriction module 65 to assist in the steering based on the intention of the driver.

Further, the motor control module 63 included in the microprocessor 60 is configured to output, when the determination result of the reverse input determination module 62 is that the current state is a reverse input state, a command signal "αa" as a steering assist force obtained by adding the compensation amount in accordance with the phase difference suppressing movement of the steering mechanism 200 due to the external force to the previous command signal "αb", to the output restriction module 65.

The frequency determination module 64 is configured to determine whether or not a frequency of oscillations included in the steering angle signal $\theta 1$ is equal to or more than a predetermined frequency or less than the predetermined frequency, and to output the determination result to the reverse input determination module 62.

The reverse input determination module 62 does not determine that the current state is the reverse input state when the steering direction of the steered wheels FL and FR corresponding to the rotation direction of the motor rotation-angle signal $\theta 2$ and the steering direction of the steered wheels FL and FR corresponding to the change direction of the steering angle signal $\theta 1$ do not match, and the frequency determination module 64 determines that the frequency is less than the predetermined value.

As a result, the ability to return to a neutral position can be improved.

The output restriction module 65 included in the microprocessor 60 is configured to perform output restriction processing so as to suppress sudden changes and oscillations in the command signal "αa", and to output the command signal "αb", which is a steering assist force, to the electric motor.

Further, the output restriction module 65 performs output restriction processing so that the command signal "αa", which is a steering assist force at which the motor control module 63 suppresses the movement of the steering mechanism 200 due to an external force being an input from the steered wheels FL and FR, does not exceed a predetermined value, and outputs the command signal "αb" to the electric motor.

As a result, the movement of the steering mechanism 200 due to the reverse input is suppressed, and therefore the steering operation for turning can be prevented from being hindered.

Figure 3:
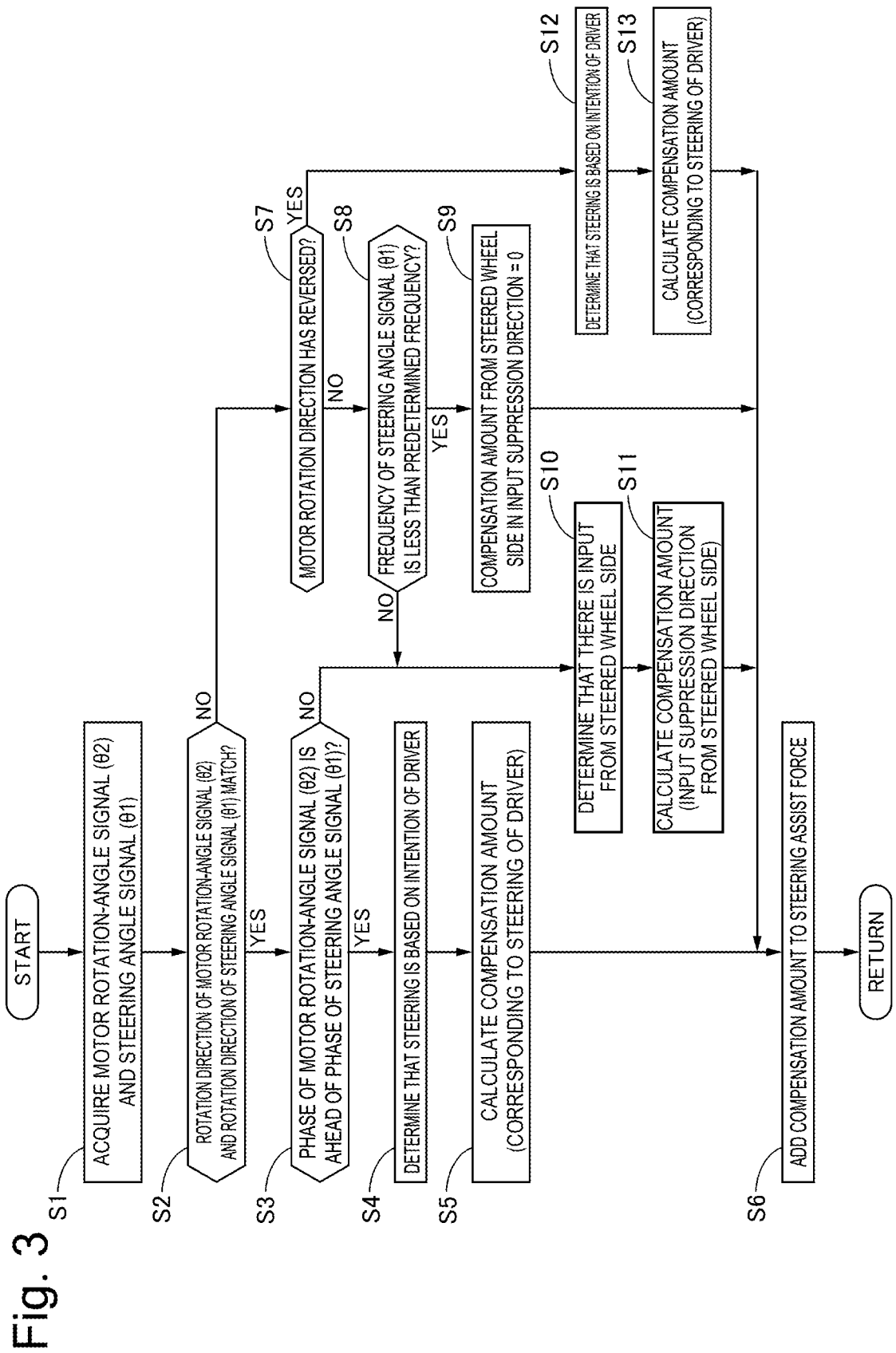
FIG. 3 is a flowchart for illustrating a control flow in the first embodiment.

FIG. 3 is a flowchart for illustrating a control flow in the first embodiment.

The flowchart is repeatedly executed at a predetermined calculation cycle.

In Step 51, the steering angle signal $\theta 1$ and the motor rotation-angle signal $\theta 2$ are acquired.

In Step S2, it is determined whether or not the rotation direction of the motor rotation-angle signal $\theta 2$ and the rotation direction of the steering angle signal $\theta 1$ match.

When the rotation direction of the motor rotation-angle signal $\theta 2$ and the rotation direction of the steering angle signal $\theta 1$ match, the processing advances to Step S3, and when the rotation direction of the motor rotation-angle signal θ2 and the rotation direction of the steering angle signal θ1 do not match, the processing advances to Step S7.

As a result, when the steering direction of the steered wheels FL and FR corresponding to the rotation direction of the motor rotation-angle signal θ2 and the steering direction of the steered wheels FL and FR corresponding to the change direction of the steering angle signal θ1 do not match, there is a high possibility that the rack bar 101 is moved by a reverse input counter to the movement of the electric motor 2, and hence a reverse input can be determined with high accuracy.

In Step S3, it is determined whether or not the motor rotation-angle signal θ2 is ahead of the steering angle signal θ1.

When the phase of the motor rotation-angle signal θ2 is ahead of the phase of the steering angle signal θ1, the processing advances to Step S4, and when the phase of the motor rotation-angle signal θ2 is not ahead of the phase of the steering angle signal θ1, the processing advances to Step S10.

In Step S4, it is determined that the current state is a forward input state.

In Step S5, a compensation amount in accordance with the phase difference corresponding to the steering of the driver is calculated.

In Step S6, the compensation amount is added to the steering assist force.

In Step S7, it is determined whether or not the electric motor 2 has reversed the rotation direction.

When the electric motor 2 has reversed the rotation direction, the processing advances to Step S12, and when the electric motor 2 has not reversed the rotation direction, the processing advances to Step S8.

As a result, immediately after the electric motor 2 reverses the rotation direction from a clockwise rotating state (right steering direction) to a counterclockwise direction, due to the influence of the inertia of the steered wheels FL and FR and the rack bar 101, the direction of the steering angle signal θ1 is not yet reversed, and follows at a later time. Thus, immediately after the rotation direction of the electric motor 2 is switched, by avoiding determining that the current state is a reverse input state even when the change directions of the steering angle signal θ1 and the motor rotation-angle signal θ2 do not match, it is possible to perform an even more accurate reverse input determination.

In Step S8, it is determined whether or not the frequency of the steering angle signal θ1 is less than a predetermined frequency.

When the frequency of the steering angle signal θ1 is less than the predetermined frequency, the processing advances to Step S9, and when the frequency of the steering angle signal θ1 is not less than the predetermined frequency, the processing advances to Step S10.

As a result, when, not during travel on a rough road, but due to self-aligning torque, the steering direction of the steered wheels FL and FR corresponding to the rotation direction of the motor rotation-angle signal θ2 and the steering direction of the steered wheels FL and FR corresponding to the change direction of the steering angle signal θ1 do not match, the frequency of oscillations included in the steering angle signal θ1 becomes a relatively low frequency. When the steering direction of the steered wheels FL and FR corresponding to the rotation direction of the motor rotation-angle signal θ2 and the steering direction of the steered wheels FL and FR corresponding to the change direction of the steering angle signal θ1 do not match due to such a self-aligning torque, by avoiding suppressing the movement of the steering mechanism 200 due to the self-aligning torque, a return movement of the steered wheels FL and FR to the neutral position is not hindered, and therefore the ability to return to the neutral position can be improved.

In Step S10, it is determined that there is an input from the steered wheel side, that is, the current state is a reverse input state.

In Step S11, the compensation amount in accordance with the phase difference is calculated so that the movement of the steering mechanism 200 due to an external force, which is an input from the steered wheels FL and FR, is suppressed, and the processing advances to Step S6.

In Step S12, it is determined that the steering is performed based on an intention of the driver, that is, the current state is a forward input state.

In Step S13, a compensation amount in accordance with the phase difference corresponding to the steering of the driver is calculated.

Thus, when it is determined that the current state is a reverse input state, the steering force by the electric motor 2 is controlled so that the movement of the steering mechanism 200 is suppressed, and therefore the steered wheels FL and FR are stabilized and steering performance can be improved.

Further, the reverse input from the road surface is transmitted to the steering wheel SW via the steered wheels FL and FR and the steering mechanism 200, but the reverse input transmitted to the steering wheel SW can be suppressed, and therefore the steering feeling can be improved.

Figure 4:
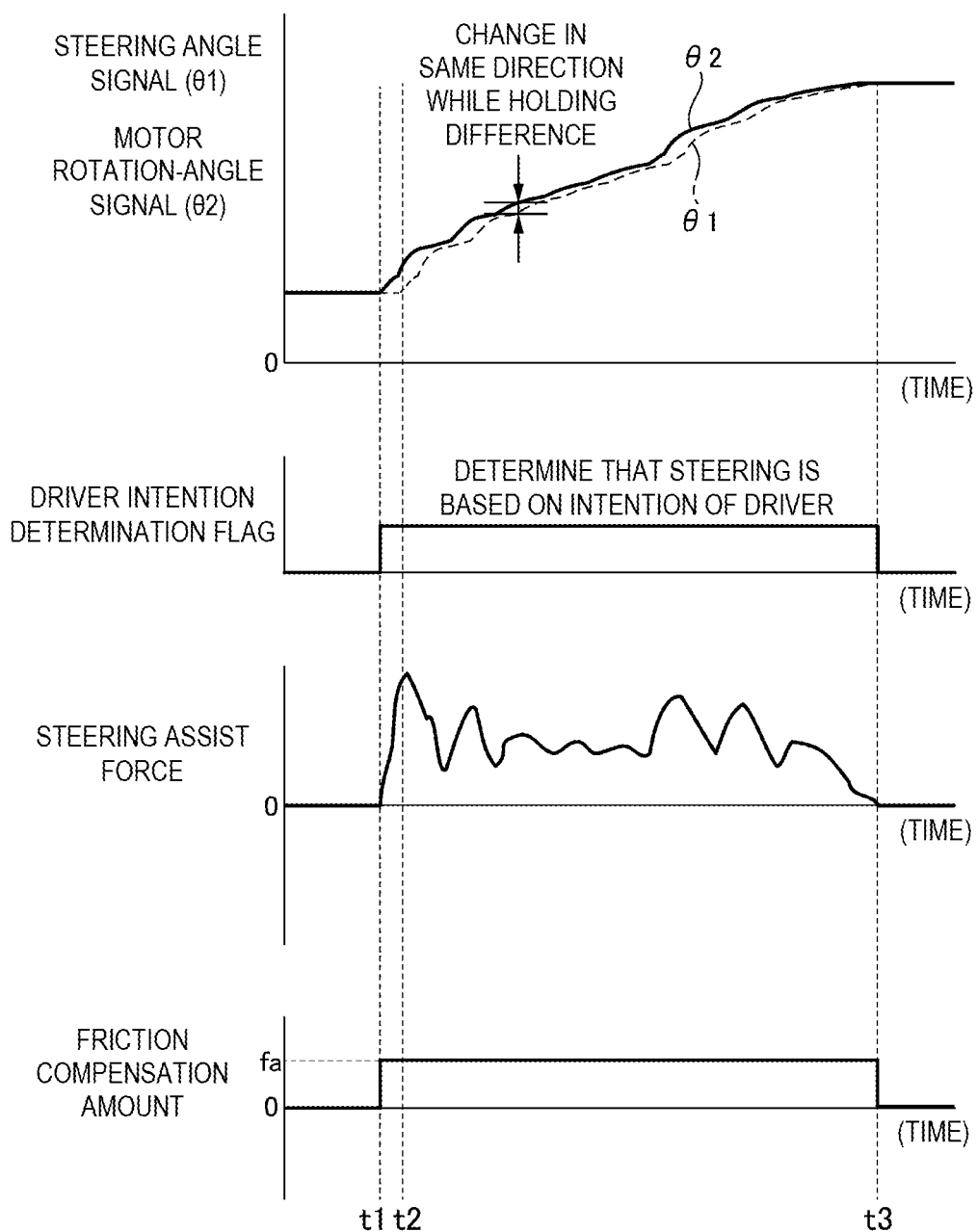
FIG. 4 is a time chart for showing control performed when it is determined that a current state is a forward input state in the first embodiment.

FIG. 4 is a time chart for showing control performed when it is determined that the current state is a forward input state in the first embodiment.

The vertical axis represents, from the top, change in the steering angle signal θ1 and motor rotation-angle signal θ2, change in a driver intention determination flag, change in the steering assist force, and change in a friction compensation amount. The horizontal axis represents time.

For the steering angle signal θ1 and the motor rotation-angle signal θ2, positive indicates right steering and negative indicates left steering.

At a time t1, the phase of the motor rotation-angle signal θ2 is ahead, and therefore it is determined that the current state is a forward input state, and the driver intention determination flag is set.

Further, a positive friction compensation amount "fa" is calculated and added to the steering assist force so as to assist in the steering based on the intention of the driver.

The friction compensation amount "fa" is a constant value.

As a result, the electric motor 2 outputs, in response to the steering by the driver, a positive steering assist force assisting in the steering based on the intention of the driver from a right-steering holding state.

At a time t2, the steered wheels FL and FR start further right steering with a delay because the driving force of the electric motor 2 acts via the endless belt 94 serving as the flexible element.

At a time t3, the right steering ends and the steering is held.

Figure 5:
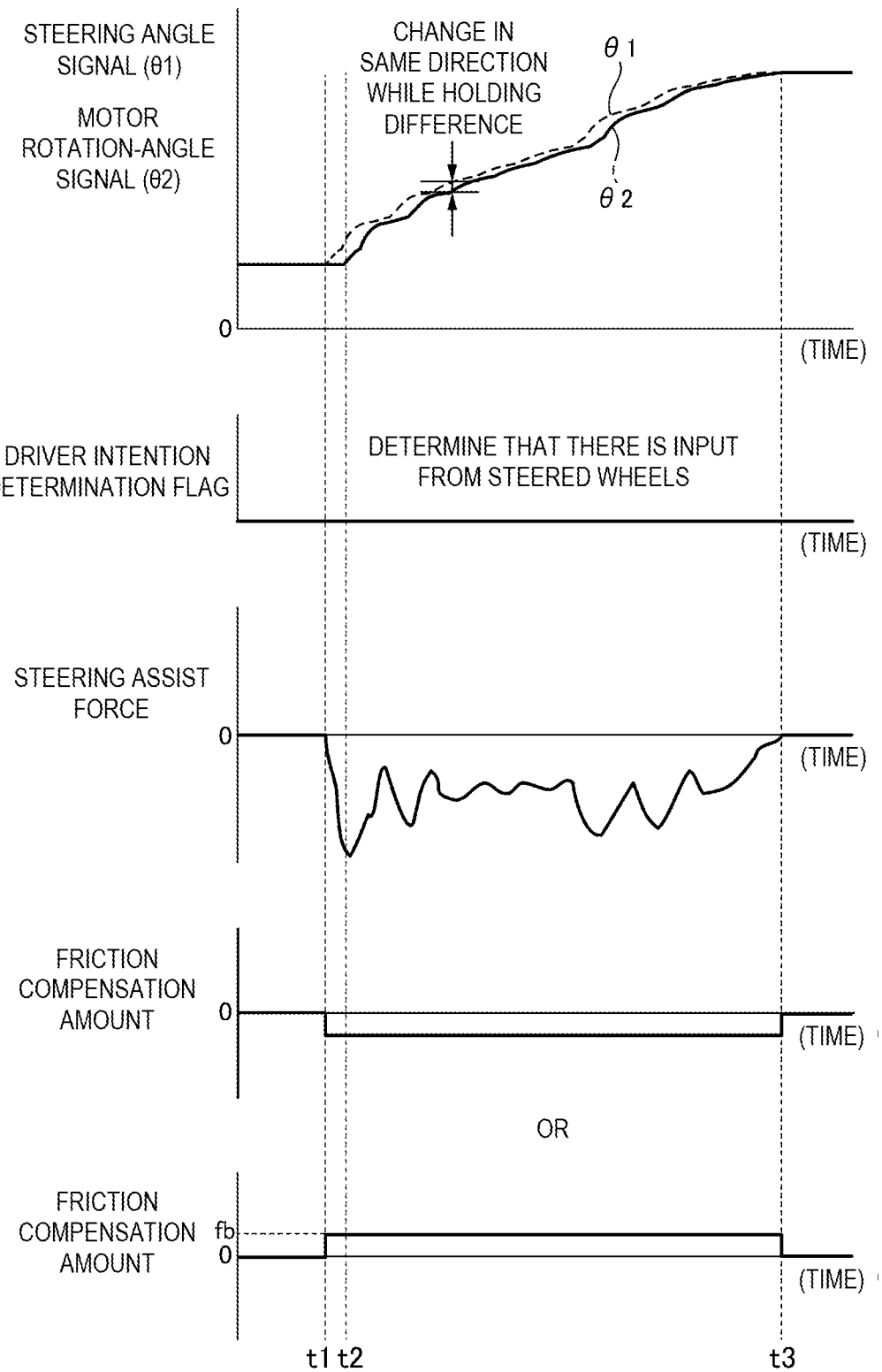
FIG. 5 is a time chart for showing control performed when it is determined that the current state is a reverse input state in the first embodiment.

FIG. 5 is a time chart for showing control performed when it is determined that the current state is a reverse input state in the first embodiment.

The vertical axis represents, from the top, change in the steering angle signal θ1 and motor rotation-angle signal θ2, change in the driver intention determination flag, change in the steering assist force, and change in two types of friction compensation amounts. The horizontal axis represents time.

For the steering angle signal θ1 and the motor rotation-angle signal θ2, positive indicates right steering and negative indicates left steering.

At the time t1, the phase of the steering angle signal θ1 is ahead, and therefore it is determined that the current state is a reverse input state, and the driver intention determination flag is not set.

Further, the friction compensation amount is calculated and added to the steering assist force that the movement of the steering mechanism 200 due to the external force, which is an input from the steered wheels FL and FR, is suppressed.

The friction compensation amount is a constant value, but compared with the forward input state, the friction compensation amount may be a negative friction compensation amount, or a positive friction compensation amount "fb" smaller than a positive friction compensation amount (fb<fa).

That is, the electric motor 2 outputs a negative steering assist force such that the movement of the steering mechanism 200 due to an external force, which is an input from the steered wheels FL and FR, is suppressed.

At the time t2, the steered wheels FL and FR are delayed by the action of the external force, which is an input from the steered wheels FL and FR, via the endless belt 94 serving as the flexible element, and therefore the motor rotor 2b of the electric motor 2 rotates further in the right steering direction.

After the time t2, the steering force by the electric motor 2 is controlled such that the movement of the steering mechanism 200 is suppressed, and therefore at the time t3, the external force, which is an input from the steered wheels FL and FR, is no longer acting and the steering is in a holding state.

Next, actions and effects are described.

The steering device of the first embodiment provides the actions and effects listed below.

(1) When it is determined that the rack bar 101 is moving, that is, when it is determined that the current state is a reverse input state, due to an external force, which is an input from the steered wheels FL and FR side, from the road surface during travel on a rough road, for example, a gravel road or an unpaved road or from the road surface in other situations, the steering force by the electric motor 2 is controlled such that the movement of the steering mechanism 200 is suppressed.

Thus, the steered wheels FL and FR are stabilized and steering performance can be improved.

(2) The driving force of the electric motor 2 is transmitted to the steering mechanism 200 via the speed reducer 400 constructed from the motor pulley 93, the nut pulley 92 and the endless belt 94.

As a result, the endless belt 94 serves as the flexible element, and this configuration increases the likelihood of the phase difference appearing between the motor rotation-angle signal θ2 and the steering angle signal θ1. Thus, the determination accuracy of the reverse input determination module 62 can be improved.

(3) When it is determined that the current state is a reverse input state in the steering device 1 in which the steering wheel SW and the steered wheels FL and FR are mechanically connected, the steering force by the electric motor 2 is controlled such that the movement of the steering mechanism 200 is suppressed.

Therefore, the reverse input from the road surface is transmitted to the steering wheel SW via the steered wheels FL and FR and the steering mechanism 200, but the reverse input transmitted to the steering wheel SW can be suppressed, and therefore the steering feeling can be improved.

(4) The steering angle sensor 22 is arranged in addition to the rack bar stroke sensor 21 serving as a steering amount sensor.

Therefore, when the rack bar stroke sensor 21 fails, a reverse input determination can be continued by using the output signal of the steering angle sensor 22 as a substitute for the output signal of the rack bar stroke sensor 21.

(5) The reverse input determination module 62 is configured to determine that the current state is a reverse input state when the steering direction of the steered wheels FL and FR corresponding to the rotation direction of the motor rotation-angle signal θ2 and the steering direction of the steered wheels FL and FR corresponding to the change direction of the steering angle signal θ1 do not match.

Therefore, when the current state is not a reverse input state, the rack bar 101 is moved by the rotational force of the electric motor 2, and the electric motor 2 and the rack bar 101 operate in the same direction with respect to the steering direction of the steered wheels FL and FR. Meanwhile, when the steering direction of the steered wheels FL and FR corresponding to the rotation direction of the motor rotation-angle signal θ2 and the steering direction of the steered wheels FL and FR corresponding to the change direction of the steering angle signal θ1 do not match, there is a high possibility that the rack bar 101 is moved by a reverse input counter to the movement of the electric motor 2, and hence a reverse input can be determined with high accuracy.

(6) The reverse input determination module 62 is configured to avoid determining that the current state is a reverse input state when the direction of the steered wheels FL and FR corresponding to the rotation direction of the motor rotation-angle signal θ2 after the rotation direction of the motor rotation-angle signal θ2 has been reversed and the steering direction of the steered wheels FL and FR corresponding to the change direction of the steering angle signal θ1 do not match.

Therefore, immediately after the electric motor 2 reverses the rotation direction from the clockwise rotating state (right steering direction) to the counterclockwise direction, due to the influence of the inertia of the steered wheels FL and FR and the rack bar 101, the direction of the steering angle signal θ1 is not yet reversed, and follows at a later time.

Thus, immediately after the rotation direction of the electric motor 2 is switched, by avoiding determining that the current state is a reverse input state even when the change directions of the steering angle signal θ1 and the motor rotation-angle signal θ2 do not match, it is possible to perform an even more accurate reverse input determination.

(7) The frequency determination module 64 is configured to determine whether or not a frequency of oscillations included in the steering angle signal θ1 is equal to or more than a predetermined frequency or less than the predetermined frequency, and the reverse input determination module 62 is configured to avoid determining that the current state is a reverse input state when the steering direction of the steered wheels FL and FR corresponding to the rotation direction of the motor rotation-angle signal θ2 and the steering direction of the steered wheels FL and FR corresponding to the change direction of the steering angle signal θ1 do not match and the frequency determination module 64 determines that the frequency of oscillations included in the steering angle signal θ1 is less than the predetermined frequency.

Therefore, when the current state is a reverse input during travel on a rough road, the frequency of oscillations included in the steering angle signal θ1 becomes a relatively high frequency. Meanwhile, not during travel on a rough road, but due to self-aligning torque, when the steering direction of the steered wheels FL and FR corresponding to the rotation direction of the motor rotation-angle signal θ2 and the steering direction of the steered wheels FL and FR corresponding to the change direction of the steering angle signal θ1 do not match, the frequency of oscillations included in the steering angle signal θ1 becomes a relatively low frequency. When the steering direction of the steered wheels FL and FR corresponding to the rotation direction of the motor rotation-angle signal θ2 and the steering direction of the steered wheels FL and FR corresponding to the change direction of the steering angle signal 01 do not match due to such a self-aligning torque, by avoiding suppressing the movement of the steering mechanism 200 due to the self-aligning torque, a return movement of the steered wheels FL and FR to the neutral position is not hindered, and therefore the ability to return to the neutral position can be improved.

(8) The output restriction module 65 is configured to perform, when the reverse input determination module 62 determines that the current state is the reverse input state, output restriction processing that the command signal "αa" suppressing the movement of the steering mechanism 200 is not equal to or more than a predetermined value.

Therefore, the movement of the steering mechanism 200 due to the reverse input is suppressed, and therefore the steering operation for turning can be prevented from being hindered.

Second Embodiment

Figure 6:
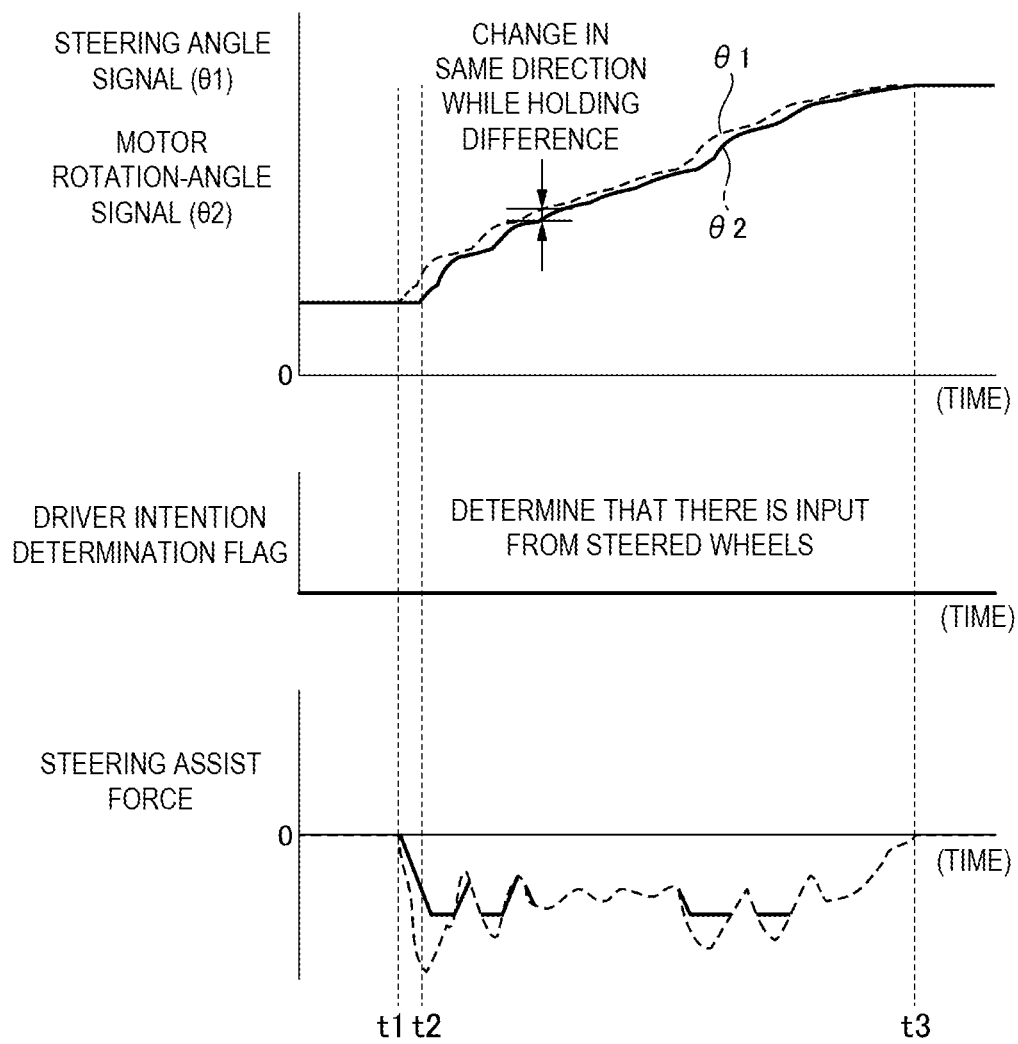
FIG. 6 is a time chart for showing control performed when it is determined that the current state is a reverse input state in a second embodiment of the present invention.

FIG. 6 is a time chart for showing control performed when it is determined that the current state is a reverse input state in a second embodiment of the present invention.

The vertical axis represents, from the top, change in the steering angle signal θ1 and motor rotation-angle signal θ2, change in the driver intention determination flag, and change in the steering assist force. The horizontal axis represents time.

For the steering angle signal θ1 and the motor rotation-angle signal θ2, positive indicates right steering and negative indicates left steering.

In the second embodiment, a restriction is applied on an amplitude and an inclination of change in the steering assist force (the broken line is the first embodiment and the solid line is the second embodiment).

Other configurations are similar to those in the first embodiment. Therefore, like components are denoted by like reference numerals, and description thereof is omitted.

Therefore, the second embodiment provides the same actions and effects as those of the first embodiment.

Third Embodiment

Figure 7:
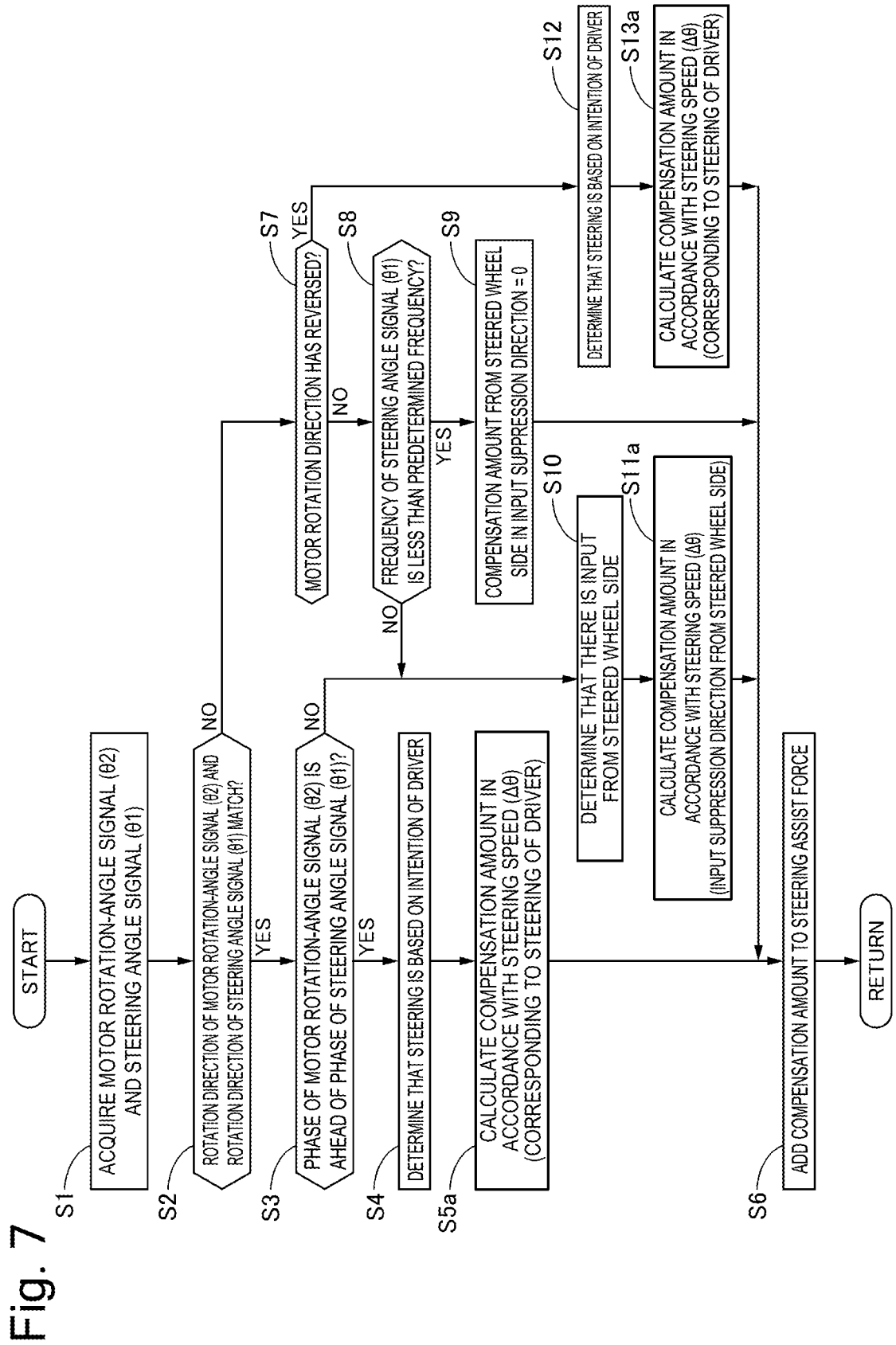
FIG. 7 is a flowchart for illustrating a control flow in a third embodiment of the present invention.

FIG. 7 is a flowchart for illustrating a control flow in a third embodiment of the present invention.

In the first embodiment, the compensation amount is a predetermined value in accordance with the phase difference, but in the third embodiment, the compensation amount is set in accordance with the steering speed as well (Step S5a, Step S11a, Step S13a).

Other configurations are similar to those in the first embodiment. Therefore, like components are denoted by like reference numerals, and description thereof is omitted.

Therefore, in the third embodiment, in addition to the actions and effects of the first embodiment, the accuracy of calculating the compensation amount in the forward input state or the reverse input state can be improved.

Figure 8:
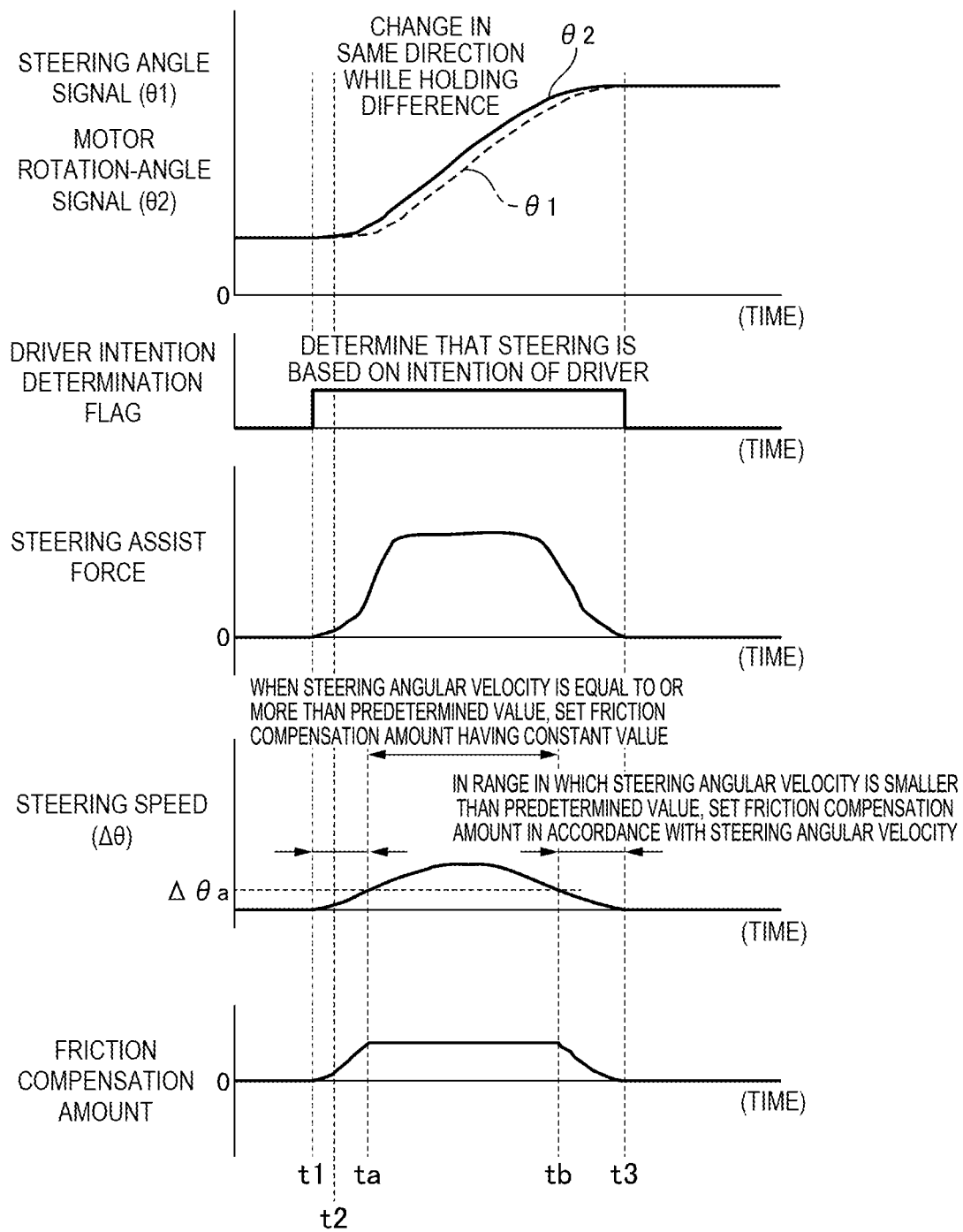
FIG. 8 is a time chart for showing control performed when it is determined that the current state is a forward input state in the third embodiment.

FIG. 8 is a time chart for showing control performed when it is determined that the current state is a forward input state in the third embodiment.

The vertical axis represents, from the top, change in the steering angle signal θ1 and motor rotation-angle signal θ2, change in the driver intention determination flag, change in the steering assist force, change in a steering angular velocity Δθ, and change in the friction compensation amount. The horizontal axis represents time.

For the steering angle signal θ1 and the motor rotation-angle signal θ2, positive indicates right steering and negative indicates left steering.

In the third embodiment, in a range in which the steering angular velocity Δθ is smaller than a predetermined value Δθa, a positive friction compensation amount in accordance with the steering angular velocity Δθ is set in order to assist in the forward input state, and in a range in which the steering angular velocity Δθ is equal to or more than the predetermined value Δθa, a positive friction compensation amount of a constant value is set and added to the steering assist force.

As a result, the electric motor 2 outputs a positive steering assist force assisting in the steering based on the intention of the driver.

Figure 9:
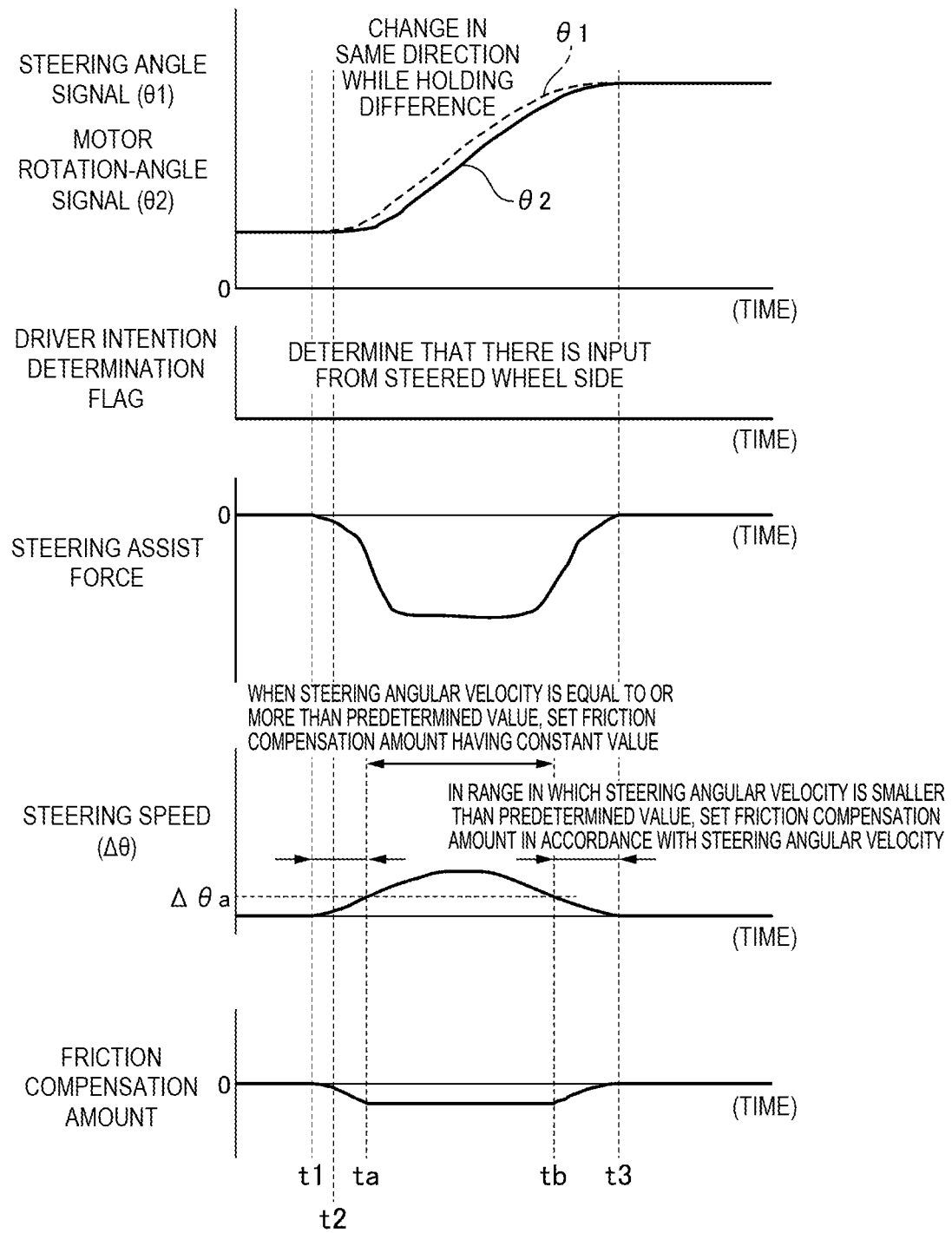
FIG. 9 is a time chart for showing control performed when it is determined that the current state is a reverse input state in the third embodiment.

FIG. 9 is a time chart for showing control performed when it is determined that the current state is a reverse input state in the third embodiment.

The vertical axis represents, from the top, change in the steering angle signal θ1 and motor rotation-angle signal θ2, change in the driver intention determination flag, change in the steering assist force, change in a steering angular velocity Δθ, and change in the friction compensation amount. The horizontal axis represents time.

For the steering angle signal θ1 and the motor rotation-angle signal θ2, positive indicates right steering and negative indicates left steering.

In the third embodiment, in a range in which the steering angular velocity Δθ is smaller than a predetermined value Δθa, a negative friction compensation amount in accordance with the steering angular velocity Δθ is set in order to suppress input from the steered wheel side, and in a range in which the steering angular velocity Δθ is equal to or more than the predetermined value Δθa, a negative friction compensation amount of a constant value is set and added to the steering assist force.

As a result, the electric motor 2 outputs a negative steering assist force such that the movement of the steering mechanism 200 due to the external force, which is an input from the steered wheels FL and FR, is suppressed.

Fourth Embodiment

Figure 10:
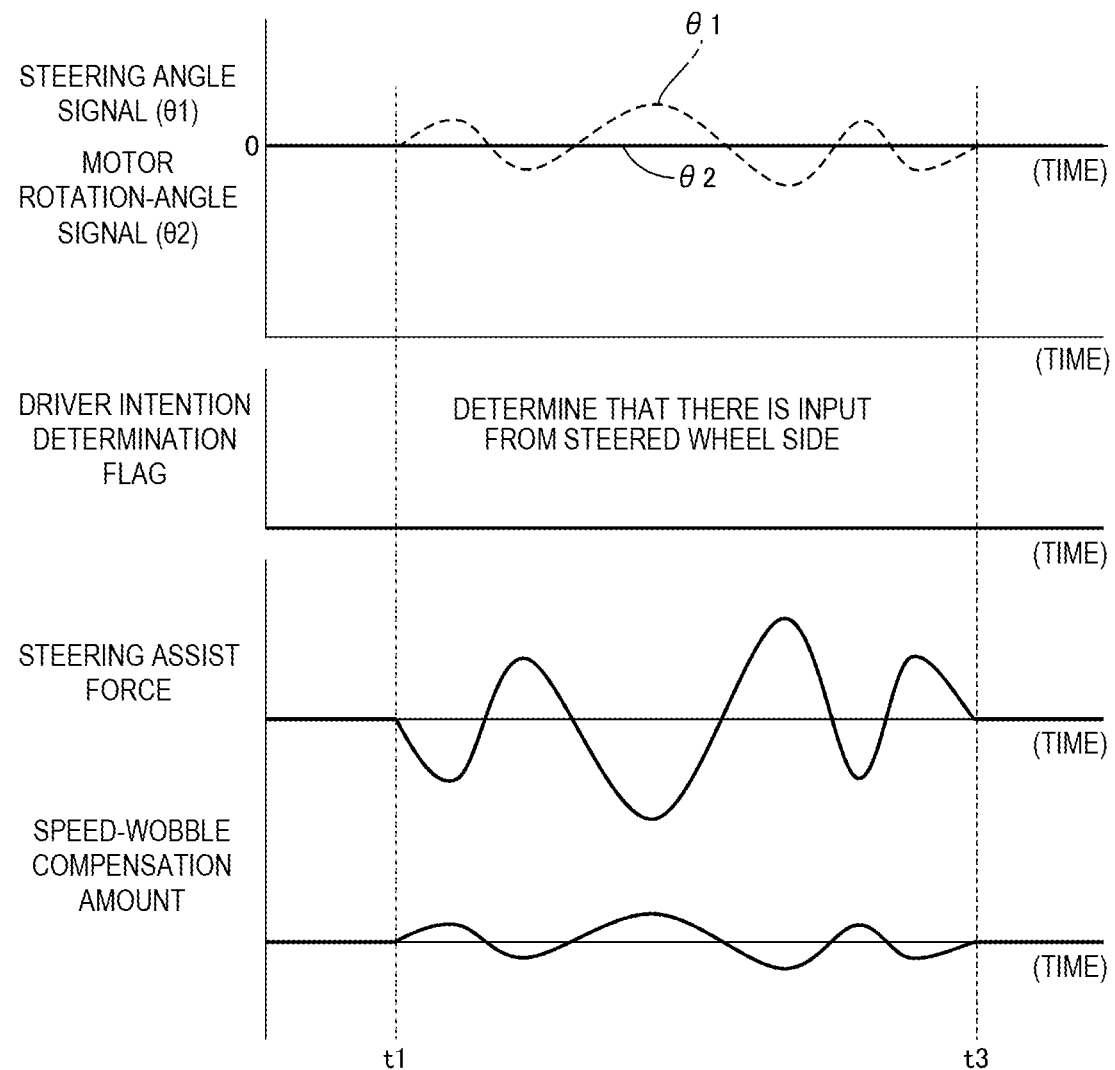
FIG. 10 is a time chart for showing control performed when it is determined that the current state is a reverse input state in a fourth embodiment of the present invention.

FIG. 10 is a time chart for showing control performed when it is determined that there is an input from the steered wheel side in a fourth embodiment of the present invention.

The vertical axis represents, from the top, change in the steering angle signal θ1 and motor rotation-angle signal θ2, change in the driver intention determination flag, change in the steering assist force, and change a in a speed-wobble control compensation amount. The horizontal axis represents time.

For the steering angle signal θ1 and the motor rotation-angle signal θ2, positive indicates right steering and negative indicates left steering.

In the fourth embodiment, during a neutral state in which the steering is not performed based on an intention of the driver, when there is movement of the rack bar 101 due to a periodic external force, which is the input from the steered wheels FL and FR to the steering mechanism 200, that is, in the reverse input state, a speed-wobble phenomenon (or shimmy phenomenon) in which the steering wheel SW is shaken or oscillates occurs.

In the fourth embodiment, a speed-wobble control compensation amount is calculated and added to the steering assist force so that the steering assist force is in the opposite phase to the periodic external force.

Other configurations are similar to those in the first embodiment. Therefore, like components are denoted by like reference numerals, and description thereof is omitted.

Therefore, in the fourth embodiment, in addition to the actions and effects of the first embodiment, it is possible to suppress a speed-wobble phenomenon (or shimmy phenomenon) in the reverse input state and improve the steering feeling.

Fifth Embodiment

Figure 11:
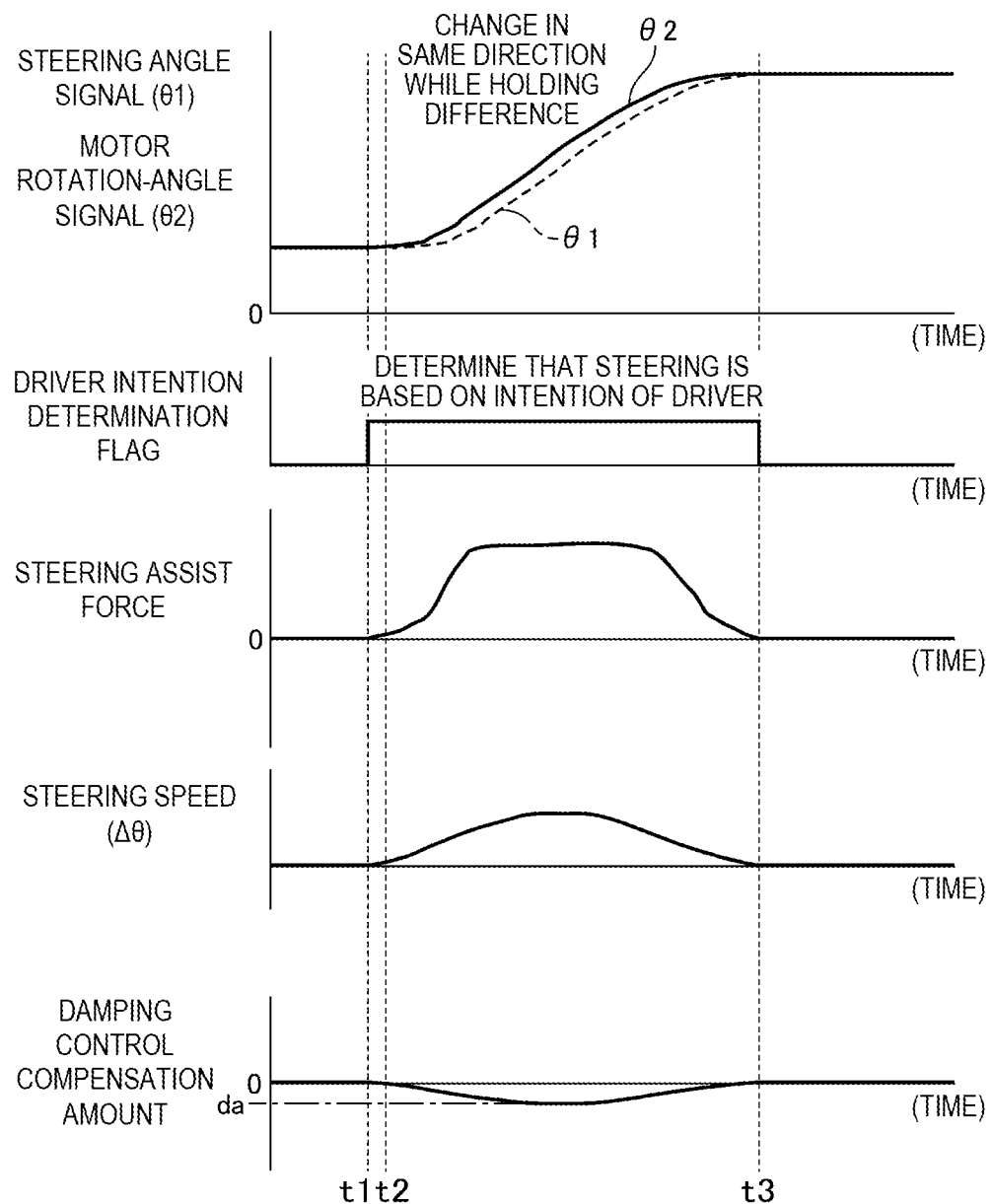
FIG. 11 is a time chart for showing control performed when it is determined that the current state is a forward input state in a fifth embodiment of the present invention.
Figure 12:
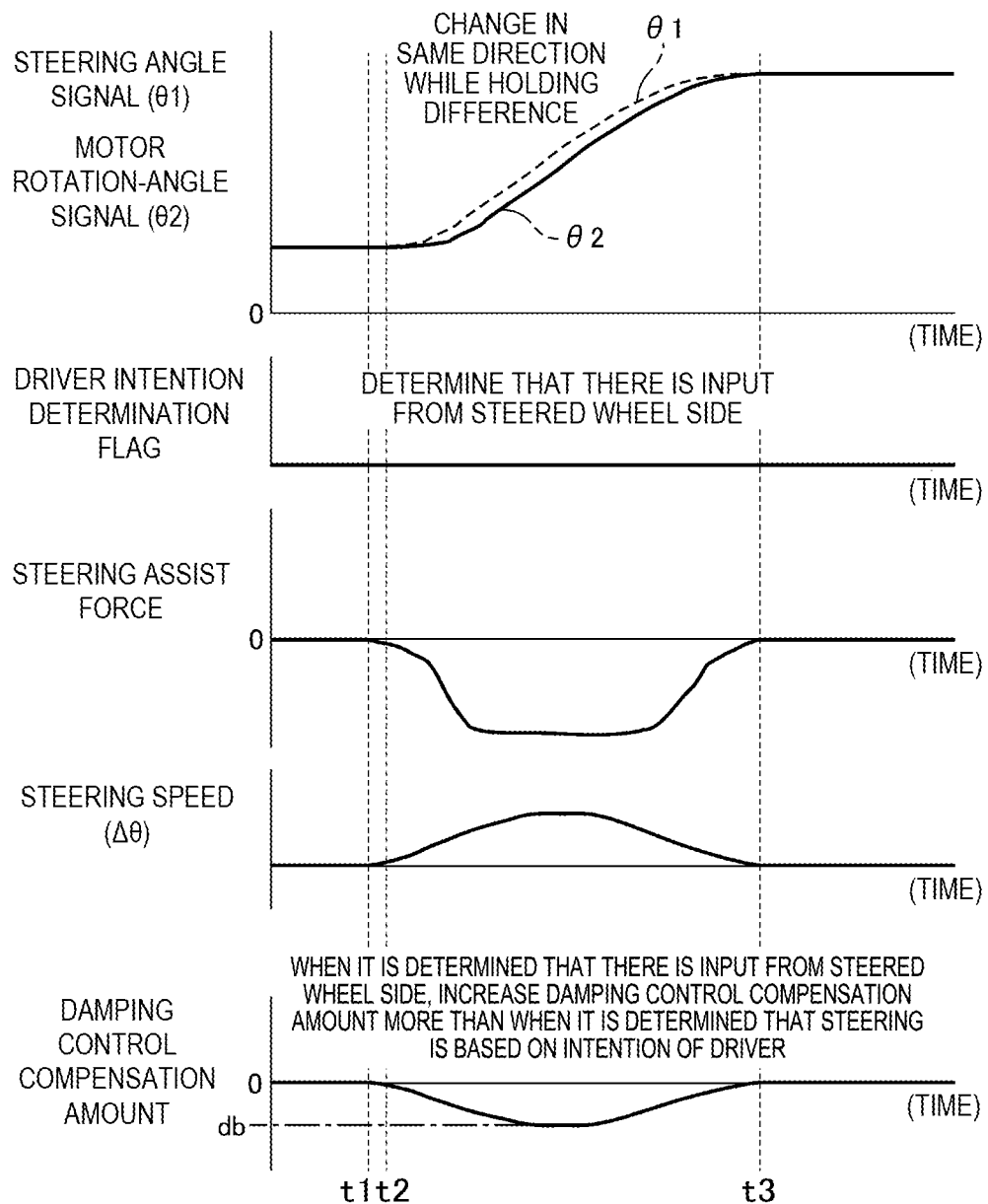
FIG. 12 is a time chart for showing control performed when it is determined that the current state is a reverse input state in the fifth embodiment.

FIG. 11 is a time chart for showing control performed when it is determined that steering is based on the intention of the driver in a fifth embodiment of the present invention. FIG. 12 is a time chart for showing control performed when it is determined that there is an input from the steered wheel side in the fifth embodiment.

The vertical axis represents, from the top, change in the steering angle signal $\theta 1$ and motor rotation-angle signal $\theta 2$, change in the driver intention determination flag, change in the steering assist force, change in the steering angular velocity $\Delta\theta$, and change in a damping control compensation amount. The horizontal axis represents time.

For the steering angle signal $\theta 1$ and the motor rotation-angle signal $\theta 2$, positive indicates right steering and negative indicates left steering.

In the fifth embodiment, unlike the third embodiment, the damping control compensation amount in accordance with the steering angular velocity $\Delta\theta$ is calculated and added to the steering assist force.

A maximum negative-direction value of a damping compensation amount "db" in the reverse input state is increased in the negative direction and set to be higher than the maximum negative-direction value of a damping compensation amount "da" in the forward input state.

Other configurations are similar to those in the first embodiment. Therefore, like components are denoted by like reference numerals, and description thereof is omitted.

Therefore, in the fifth embodiment, in addition to the actions and effects of the third embodiment, it is possible to further suppress the reverse input state and further improve the steering feeling.

Sixth Embodiment

Configuration of Power Steering Device

Figure 13:
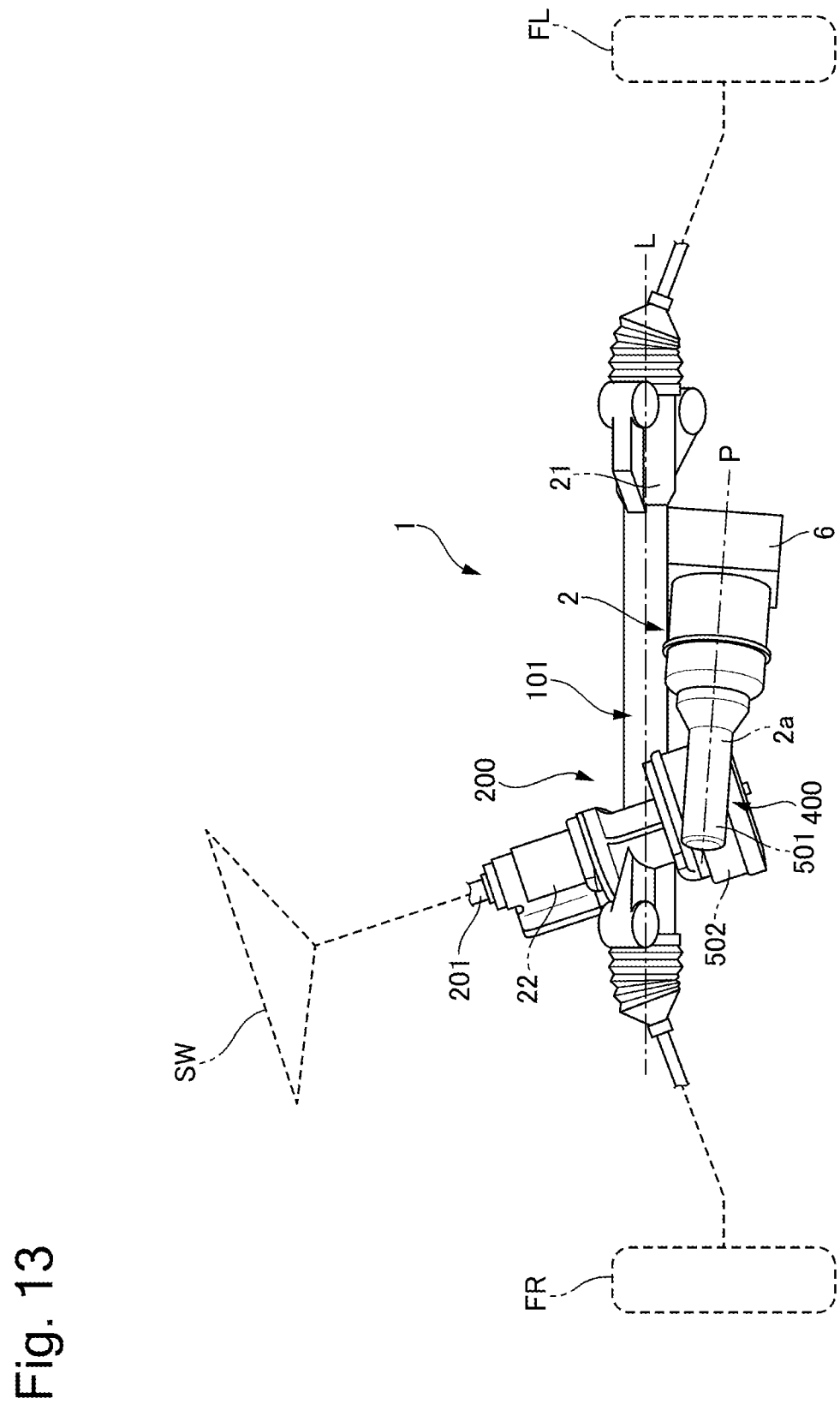
FIG. 13 is a configuration diagram for illustrating an electric power steering device 1 according to a sixth embodiment of the present invention.

FIG. 13 is a configuration diagram for illustrating an electric power steering device 1 according to a sixth embodiment of the present invention.

In the first embodiment, the speed reducer 400 is constructed from the motor pulley 93, the nut pulley 92, and the endless belt 94, but in the sixth embodiment, the speed reducer 400 is constructed from a worm wheel 502 including, at an outer periphery, worm teeth made of resin, which is integrally fixed to a lower end portion of the rod-shaped steering shaft 201, and a worm shaft 501 including, at an outer periphery, teeth which are integrally fixed to a tip portion of the motor output shaft 2a and which mesh with the resin worm teeth of the worm wheel 502.

Other configurations are similar to those in the first embodiment. Therefore, like components are denoted by like reference numerals, and description thereof is omitted.

In the sixth embodiment as well, the driving force of the electric motor 2 is transmitted to the steering shaft 201 via the resin worm teeth of the worm wheel 502 serving as a flexible element, and therefore the driving force of the electric motor 2 to the steering mechanism 200 is transmitted in a delayed manner.

Therefore, the resin worm teeth of the worm wheel 502 act as the flexible element, and a phase difference between the motor rotation-angle signal $\theta 2$ and the steering angle signal $\theta 1$ tends to appear. The determination accuracy of the reverse input determination module 62 can thus be improved, and the same actions and effects as those of the first embodiment are provided.

Seventh Embodiment

Configuration of Power Steering Device

Figure 14:
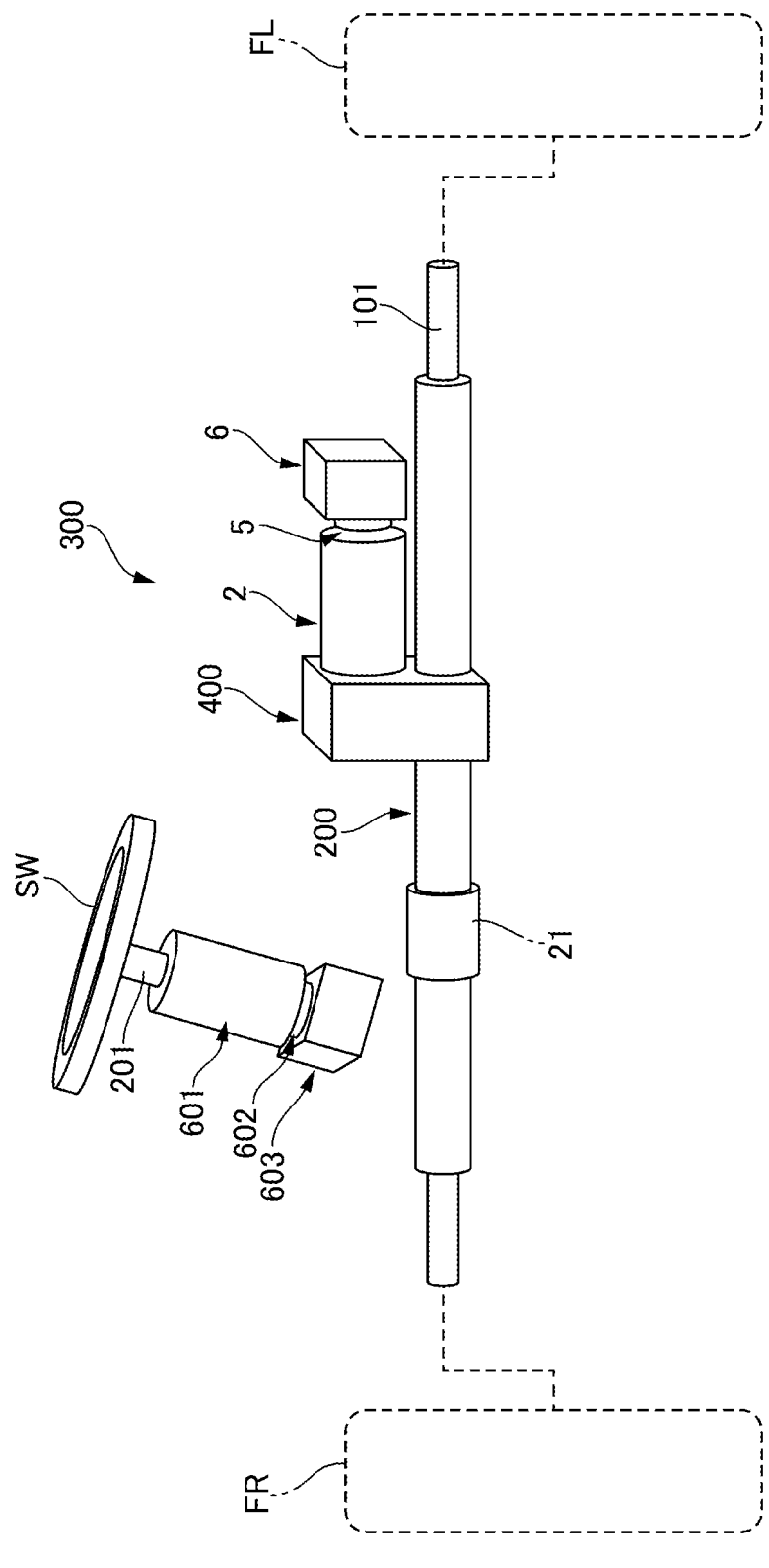
FIG. 14 is a configuration diagram for illustrating an electric power steering device 1 according to a seventh embodiment of the present invention.

FIG. 14 is a configuration diagram for illustrating an electric power steering device 1 according to a seventh embodiment of the present invention.

That is, the electric power steering device 1 is a so-called clutchless steering-by-wire power steering device in which the steering wheel SW and the steering mechanism 200 are mechanically separated.

In a vehicle including a rear-wheel steering device, the steering mechanism 200 may be used as the rear-wheel steering device.

In the seventh embodiment, the configuration of the steering wheel SW side is different from that of the first embodiment.

At the lower end portion of the rod-shaped steering shaft 201 fixed to the steering wheel SW, an electric motor 601 for generating a steering reaction force, a torque-and-steering angle sensor 602, and a controller 603 are arranged.

The electric motor 601 is configured to generate a steering reaction force to the driver in accordance with the steering torque and steering amount from the torque-and-steering angle sensor 602 which are input to the steering wheel SW by the driver.

The output of the electric motor 2 is controlled by the controller 6 in accordance with the steering torque and steering amount from the torque-and-steering angle sensor 602 which are input to the steering wheel SW by the driver.

Other configurations are similar to those in the first embodiment. Therefore, like components are denoted by like reference numerals, and description thereof is omitted.

Therefore, in the seventh embodiment, in addition to the actions and effects of the first embodiment, the following actions and effects can be provided.

That is, in a configuration in which the steering wheel SW and the steering mechanism 200 are mechanically separated, steering control is performed by performing feedback control such that the difference between the target rotation angle of the electric motor 2 and the steering angle signal $\theta 1$ is reduced.

Therefore, the movement of the rack bar 101 due to the external force (reverse input state), which is an input from the road surface from the steered wheels FL and the FR to the steering mechanism 200, includes an external force component in the steering angle signal θ1, and hence it is difficult to perform feedback control. However, by controlling the electric motor 2 so as to suppress the external force, which is an input from the steered wheels FL and FR to the steering mechanism 200, the steered wheels FL and FR can be stabilized, and the controllability of the steering control based on feedback control can be improved.

Other Embodiments

The embodiments of the present invention have been described above. However, the specific configuration of the present invention is not limited to the configurations described in the embodiments. A modification in design or the like without departing from the scope of the gist of the invention is also encompassed in the present invention.

For example, the steering mechanism 200 has been described as a rack-and-pinion type steering mechanism, and the steering member has been described as the rack bar 101, but the steering mechanism 200 may be a steering shaft 201 having pinion teeth formed at a tip portion thereof.

Further, when the steering mechanism 200 is a ball screw type steering mechanism, the steering member is a Pitman arm.

The steering mechanism 200 and the steering member may also be any mechanism or member other than those described above which can steer the steered wheels FL and FR.

Description is given below of technical ideas that may be obtained from the embodiments described above.

According to one aspect of the present invention, there is provided a steering device including: a steering mechanism including a steering member, the steering mechanism being configured to steer steered wheels in accordance with movement of the steering member; an electric motor including a motor rotor, a motor stator, and a motor rotation-angle sensor, the motor rotation-angle sensor being configured to detect a rotation position of the motor rotor, the electric motor being configured to apply a steering force to the steering mechanism via a speed reducer; the speed reducer arranged between the steering member and the electric motor, the speed reducer being configured to transmit a rotational force of the electric motor to the steering member; a steering amount sensor arranged in the steering mechanism, the steering amount sensor being configured to acquire a steering angle signal which is a signal relating to a steering angle of the steered wheels; and a controller including a motor rotation-angle signal input module, a steering angle signal input module, and a microprocessor, the motor rotation-angle signal input module being configured to receive, from the motor rotation-angle sensor, input of a motor rotation-angle signal which is a signal relating to the rotation position of the motor rotor, the steering angle signal input module being configured to receive input of the steering angle signal from the steering amount sensor, the microprocessor including a phase comparison module, a reverse input determination module, and a motor control module, the phase comparison module being configured to compare a phase of the motor rotation-angle signal with a phase of the steering angle signal, and to determine which of the phase of the motor rotation-angle signal and the phase of the steering angle signal is ahead, the reverse input determination module being configured to determine, when the phase of the motor rotation-angle signal is ahead of the phase of the steering angle signal, that a current state is a forward input state in which the steering member is being moved by the steering force of the electric motor, and to determine, when the phase of the steering angle signal is ahead of the phase of the motor rotation-angle signal, that the current state is a reverse input state in which the motor rotor is rotating due to an external force which is an input from the steered wheels to the steering mechanism, the motor control module being configured to output, when the reverse input determination module determines that the current state is the reverse input state, a command signal to the electric motor such that movement of the steering mechanism due to the external force is suppressed.

According to a more preferred aspect of the present invention, in the above-mentioned aspect, the electric motor includes a motor output shaft configured to rotate integrally with the motor rotor, the steering member includes a rack bar, the rack bar includes a rod-shaped rack bar main body and a rack-side ball screw groove which is a spiral groove formed on an outer periphery of the rack bar main body, the speed reducer includes a ball screw mechanism, the ball screw mechanism including a nut, balls, a nut pulley, a motor pulley, and an endless belt, the nut has a tubular shape and includes a nut-side ball screw groove which is a spiral groove on an inner peripheral side, the rack bar being inserted into an inner side of the nut, the balls are arranged between the rack-side ball screw groove and the nut-side ball screw groove, the nut pulley is integrally rotatable with the nut, the motor pulley is integrally rotatable with the motor output shaft, and the endless belt is wound around both the nut pulley and the motor pulley, and the rotational force of the electric motor is transmissible to the nut pulley via the motor pulley.

According to another preferred aspect of the present invention, in any one of the above-mentioned aspects, the electric motor includes a motor output shaft configured to rotate integrally with the motor rotor, the steering member includes a rack bar, the rack bar includes a rod-shaped rack bar main body and rack teeth arranged on the rack bar main body, the speed reducer includes a worm shaft, a worm wheel, and a pinion shaft, the worm shaft is configured to be integrally rotatable with the motor output shaft, the worm wheel includes worm teeth made of resin, and is configured to mesh with the worm shaft, the pinion shaft includes a rod-shaped pinion shaft main body and pinion teeth, which are arranged on an outer periphery of the pinion shaft main body and are configured to mesh with the rack teeth, and is integrally rotatable with the worm wheel, and the rotational force of the electric motor is transmissible to the rack bar via the worm shaft, the worm wheel, and the pinion shaft.

According to yet another preferred aspect of the present invention, in any one of the above-mentioned aspects, the steering mechanism includes a steering shaft mechanically connected to a steering wheel, and the steering member is configured to operate so as to steer the steered wheels together with rotation of the steering shaft which is rotating together with rotation of the steering wheel.

According to a more preferred aspect of the present invention, in the above-mentioned aspects, the steering device further includes a steering angle sensor, the steering angle sensor is configured to acquire the steering angle signal by detecting a rotation amount of the steering shaft, and the reverse input determination module is configured to determine whether the current state is the reverse input state based on the steering angle signal detected by the steering angle sensor.

According to yet another preferred aspect of the present invention, in any one of the above-mentioned aspects, the steering mechanism is mechanically separated from a steering wheel to which a steering operation of a driver is to be input.

According to still another preferred aspect of the present invention, in any one of the above-mentioned aspects, the reverse input determination module is configured to determine that the current state is the reverse input state when a steering direction of the steered wheels corresponding to a rotation direction of the motor rotation-angle signal and a steering direction of the steered wheels corresponding to a change direction of the steering angle signal do not match.

According to a more preferred aspect of the present invention, in the above-mentioned aspects, the reverse input determination module is configured to avoid determining that the current state is the reverse input state when a direction of the steered wheels corresponding to the rotation direction of the motor rotation-angle signal after the rotation direction of the motor rotation-angle signal has been reversed and the steering direction of the steered wheels corresponding to the change direction of the steering angle signal do not match.

According to a more preferred aspect of the present invention, in the above-mentioned aspects, the microprocessor further includes a frequency determination module, the frequency determination module is configured to determine whether a frequency of oscillations included in the steering angle signal is equal to or more than a predetermined value or less than the predetermined value, and the reverse input determination module is configured to avoid determining that the current state is the reverse input state when the steering direction of the steered wheels corresponding to the rotation direction of the motor rotation-angle signal and the steering direction of the steered wheels corresponding to the change direction of the steering angle signal do not match and the frequency determination module determines that the frequency is less than the predetermined value.

According to still another preferred aspect of the present invention, in any one of the above-mentioned aspects, the microprocessor includes an output restriction module, and the output restriction module is configured to perform output restriction processing so that the command signal to be output to the electric motor so as to suppress the movement of the steering mechanism due to the external force is not equal to or more than a predetermined value.

Note that, the present invention is not limited to the above-mentioned embodiments, and includes further various modification examples. For example, in the above-mentioned embodiments, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, and replace a part of the configuration of each of the embodiments.

The present application claims a priority based on Japanese Patent Application No. 2019-013789 filed on Jan. 30, 2019. All disclosed contents including Specification, Scope of Claims, Drawings, and Abstract of Japanese Patent Application No. 2019-013789 filed on Jan. 30, 2019 are incorporated herein by reference in their entirety.

REFERENCE SIGNS LIST

1 electric power steering device (steering device), 2 electric motor, 2*a* motor output shaft, 2*b* motor rotor, 2*c* motor stator, 5 motor rotation-angle sensor, 6 controller, 6*a* steering angle signal input module, 6*b* motor rotation-angle signal input module, 60 microprocessor, 61 phase comparison module, 62 reverse input determination module, 63 motor control module, 64 frequency determination module, 65 output restriction module, 21 rack bar stroke sensor (steering amount sensor), 22 steering angle sensor (steering amount sensor), 90 ball screw mechanism, 91 nut, 92 nut pulley (speed reducer), 93 motor pulley (speed reducer), 94 endless belt (speed reducer), 95 nut-side ball screw portion, 96 ball, 101 rack bar (steering member), 101*a* rack bar main body, 110 rack-side ball screw portion, 200 steering mechanism, 201 steering shaft, 400 speed reducer, 501 worm shaft, 502 worm wheel (speed reducer), FL left front wheel (steered wheel), FR right front wheel (steered wheel), SW steering wheel

The invention claimed is:
1. A steering device, comprising:
a steering mechanism including a steering member, the steering mechanism being configured to steer steered wheels in accordance with movement of the steering member;
an electric motor including a motor rotor, a motor stator, and a motor rotation-angle sensor, the motor rotation-angle sensor being configured to detect a rotation position of the motor rotor, the electric motor being configured to apply a steering force to the steering mechanism via a speed reducer;
the speed reducer arranged between the steering member and the electric motor, the speed reducer being configured to transmit a rotational force of the electric motor to the steering member;
a steering amount sensor arranged in the steering mechanism, the steering amount sensor being configured to acquire a steering angle signal which is a signal relating to a steering angle of the steered wheels; and
a controller including a motor rotation-angle signal input module, a steering angle signal input module, and a microprocessor,
the motor rotation-angle signal input module being configured to receive, from the motor rotation-angle sensor, input of a motor rotation-angle signal which is a signal relating to the rotation position of the motor rotor,
the steering angle signal input module being configured to receive input of the steering angle signal from the steering amount sensor,
the microprocessor including a phase comparison module, a reverse input determination module, and a motor control module,
the phase comparison module being configured to compare a phase of the motor rotation-angle signal with a phase of the steering angle signal, and to determine which of the phase of the motor rotation-angle signal and the phase of the steering angle signal is ahead,
the reverse input determination module being configured to determine, when the phase of the motor rotation-angle signal is ahead of the phase of the steering angle signal, that a current state is a forward input state in which the steering member is being moved by the steering force of the electric motor, and to determine, when the phase of the steering angle signal is ahead of the phase of the motor rotation-angle signal, that the current state is a reverse input state in which the motor rotor is rotating due to an external force which is an input from the steered wheels to the steering mechanism, the motor control module being configured to output, when the reverse input determination module determines that the current state is the reverse input state, a command signal to the electric motor such that movement of the steering mechanism due to the external force is suppressed.

2. The steering device according to claim 1, wherein the electric motor includes a motor output shaft configured to rotate integrally with the motor rotor, wherein the steering member includes a rack bar, wherein the rack bar includes a rod-shaped rack bar main body and a rack-side ball screw groove which is a spiral groove formed on an outer periphery of the rack bar main body, wherein the speed reducer includes a ball screw mechanism, the ball screw mechanism including a nut, balls, a nut pulley, a motor pulley, and an endless belt, wherein the nut has a tubular shape and includes a nut-side ball screw groove which is a spiral groove on an inner peripheral side, the rack bar being inserted into an inner side of the nut, wherein the balls are arranged between the rack-side ball screw groove and the nut-side ball screw groove, wherein the nut pulley is integrally rotatable with the nut, wherein the motor pulley is integrally rotatable with the motor output shaft, and wherein the endless belt is wound around both the nut pulley and the motor pulley, and the rotational force of the electric motor is transmissible to the nut pulley via the motor pulley.

3. The steering device according to claim 1, wherein the electric motor includes a motor output shaft configured to rotate integrally with the motor rotor, wherein the steering member includes a rack bar, wherein the rack bar includes a rod-shaped rack bar main body and rack teeth arranged on the rack bar main body, wherein the speed reducer includes a worm shaft, a worm wheel, and a pinion shaft, wherein the worm shaft is configured to be integrally rotatable with the motor output shaft, wherein the worm wheel includes worm teeth made of resin, and is configured to mesh with the worm shaft, wherein the pinion shaft includes a rod-shaped pinion shaft main body and pinion teeth, which are arranged on an outer periphery of the pinion shaft main body and are configured to mesh with the rack teeth, and is integrally rotatable with the worm wheel, and wherein the rotational force of the electric motor is transmissible to the rack bar via the worm shaft, the worm wheel, and the pinion shaft.

4. The steering device according to claim 1, wherein the steering mechanism includes a steering shaft mechanically connected to a steering wheel, and wherein the steering member is configured to operate so as to steer the steered wheels together with rotation of the steering shaft which is rotating together with rotation of the steering wheel.

5. The steering device according to claim 4, further comprising a steering angle sensor, wherein the steering angle sensor is configured to acquire the steering angle signal by detecting a rotation amount of the steering shaft, and wherein the reverse input determination module is configured to determine whether the current state is the reverse input state based on the steering angle signal detected by the steering angle sensor.

6. The steering device according to claim 1, wherein the steering mechanism is mechanically separated from a steering wheel to which a steering operation of a driver is to be input.

7. The steering device according to claim 1, wherein the reverse input determination module is configured to determine that the current state is the reverse input state when a steering direction of the steered wheels corresponding to a rotation direction of the motor rotation-angle signal and a steering direction of the steered wheels corresponding to a change direction of the steering angle signal do not match.

8. The steering device according to claim 7, wherein the reverse input determination module is configured to avoid determining that the current state is the reverse input state when a direction of the steered wheels corresponding to the rotation direction of the motor rotation-angle signal after the rotation direction of the motor rotation-angle signal has been reversed and the steering direction of the steered wheels corresponding to the change direction of the steering angle signal do not match.

9. The steering device according to claim 7, wherein the microprocessor further includes a frequency determination module, wherein the frequency determination module is configured to determine whether a frequency of oscillations included in the steering angle signal is equal to or more than a predetermined value or less than the predetermined value, and wherein the reverse input determination module is configured to avoid determining that the current state is the reverse input state when the steering direction of the steered wheels corresponding to the rotation direction of the motor rotation-angle signal and the steering direction of the steered wheels corresponding to the change direction of the steering angle signal do not match and the frequency determination module determines that the frequency is less than the predetermined value.

10. The steering device according to claim 1, wherein the microprocessor includes an output restriction module, and wherein the output restriction module is configured to perform output restriction processing so that the command signal to be output to the electric motor so as to suppress the movement of the steering mechanism due to the external force, is not equal to or more than a predetermined value.

* * * * *